Dec. 29, 1931.  C. N. FLAGG  1,839,144
FLOAT OPERATED CONTROL VALVE
Filed June 1, 1928  2 Sheets-Sheet 1
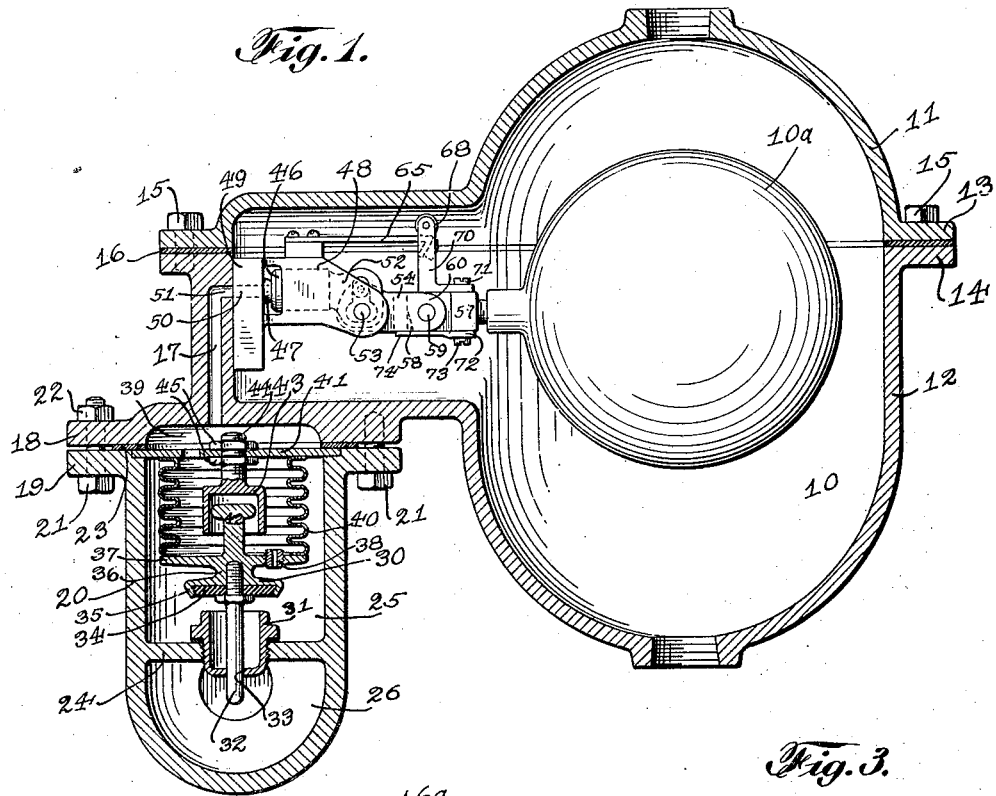
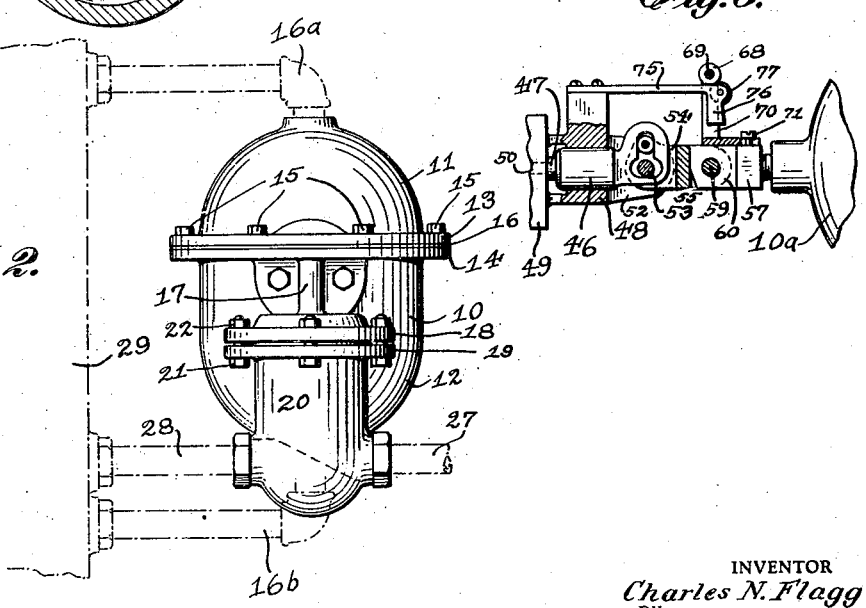
INVENTOR
Charles N. Flagg
BY H. G. Manning
ATTORNEY Dec. 29, 1931.　　　C. N. FLAGG　　　1,839,144
FLOAT OPERATED CONTROL VALVE
Filed June 1, 1928　　2 Sheets-Sheet 2
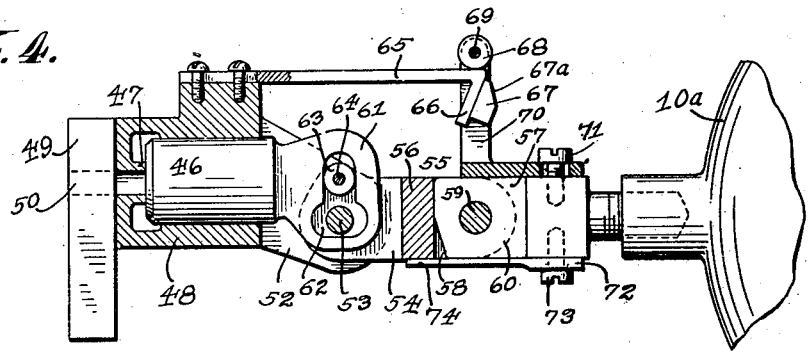
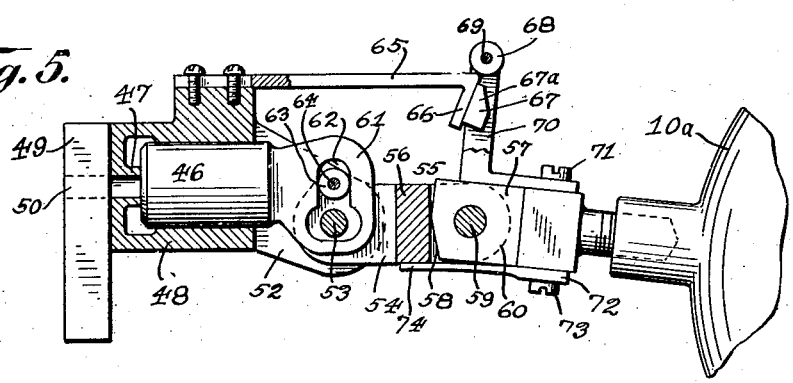
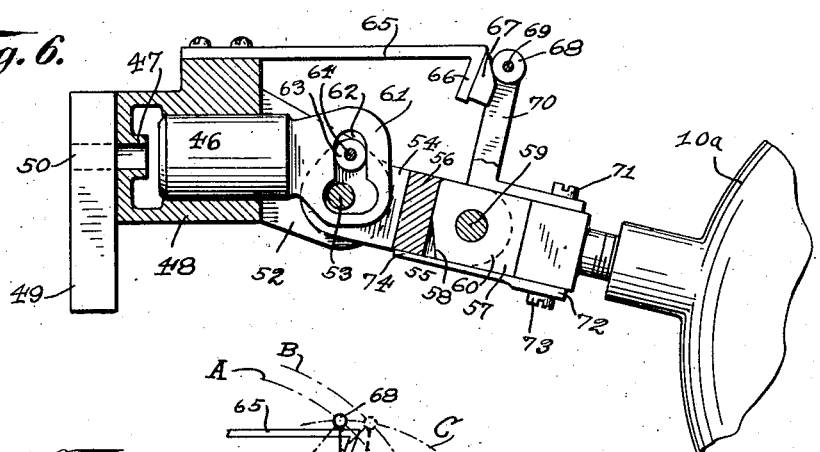
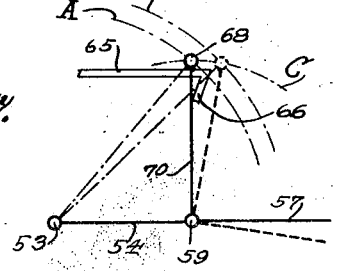
INVENTOR
Charles N. Flagg
BY H. G. Manning
ATTORNEY Patented Dec. 29, 1931

1,839,144

UNITED STATES PATENT OFFICE

CHARLES NOEL FLAGG, OF MERIDEN, CONNECTICUT

FLOAT OPERATED CONTROL VALVE

Application filed June 1, 1928. Serial No. 282,076.

This invention relates to automatic liquid level control devices, and more particularly to a combination float and diaphragm valve for regulating the flow of liquid into a boiler or other reservoir.

One object of this invention is to provide a liquid level control valve of the above nature having a diaphragm operated main valve controlled by a float-actuated relief valve, means being provided for causing the relief valve to open and close practically instantaneously so that it will never remain at a balanced partially-open position, whereby "wire-drawing" will be entirely avoided.

A further object of this invention is to provide a liquid level control valve of the above nature in which the opening of the main valve is restrained from too rapid or noisy action under high pressure by a dash-pot mechanism.

A further object is to provide a float-operated control valve of the above nature in which the relief valve is controlled by the movement of a float lever, the latter being restrained against movement until the liquid in the reservoir has reached a predetermined level, means being provided for then suddenly releasing said float to rapidly actuate said relief valve.

A further object is to provide a device of this nature which will be relatively simple in construction, inexpensive to manufacture, easy to install and manipulate, accessible for repairs and replacements, compact, ornamental in appearance, and very efficient and durable in use.

With these and other objects in view there have been illustrated on the accompanying drawings two forms in which the invention may be conveniently embodied in practice.

Fig. 1 represents a vertical sectional view of the assembled valve.

Fig. 2 is an end view of the same showing the manner in which it is connected to a steam boiler.

Fig. 3 is a fragmentary view of a modified form of trigger mechanism for operating the relief valve.

Fig. 4 is a fragmentary view of the preferred form of relief valve, jointed float lever, and trigger mechanism, the float being shown in its raised position and the relief valve closed.

Fig. 5 is a view of the same similar to Fig. 4 showing the relief valve still closed but "about to open", the float being lowered somewhat to flex the jointed lever.

Fig. 6 is a view of the same similar to Figs 4 and 5 showing the relief valve open with the float in its lowermost position.

Fig. 7 is a diagrammatic view of the relief valve and the jointed float lever mechanism.

Referring now to the drawings in which like reference numerals denote corresponding parts throughout the several views, the numeral 10 generally indicates the float casing which is preferably formed of a pair of upper and lower castings 11 and 12 which have flanged abutting edges 13 and 14 firmly secured together as by bolts 15, said flanges being separated and made water-tight by a packing ring 16. The casing 10 contains a float 10a and is connected at its top and bottom to pipes 16a and 16b leading to a steam boiler or other reservoir 29.

The lower casting 12 is provided in one side wall with a vertical passage 17 terminating at its lower end in an enlarged recess located centrally within a horizontal flange 18 which is adapted to abut against an upper flange 19 of a main valve casing 20, said flanges 18 and 19 being tightly secured together, as by bolts 21 and nuts 22, a packing ring 23 being located between said flanges 18 and 19. The main valve 20 is divided by a partition 24 into an inlet chamber 25 and an outlet chamber 26, as clearly shown in Fig. 1. The chamber 25 is connected to an inlet pipe 27, and the chamber 26 is connected to an outlet pipe 28 leading to the boiler or other reservoir 29.

In order to guide a main valve 30 in its travel toward and away from a flanged cup-shaped seat 31 supported by said partition 24, said main valve 30 has a depending dowel rod 32 screwed thereto, said dowel rod being adapted to slide within an aperture 33 in a spider-shaped base of said cup-shaped seat 31. The main valve 30 has a flexible packing disc 34 held in place by an inturned rim 35, said disc 34 being adapted to rest upon the upper rim of the main valve seat 31 when the main valve is in closed position.

Located above the main valve 30 and connected thereto by a neck 36 is a lower diaphragm plate 37 within which is a threaded by-pass tube 38 for permitting the passage of liquid from the inlet chamber 25 to a control chamber 39 located above said lower diaphragm plate within and above a flexible metallic bellows 40. The bellows 40 is connected at its lower end with the upper surface of said lower plate 37, as by soldering, and the upper end of said bellows is connected in a similar manner to a perforated upper diaphragm plate 41 seated between the flanges 18 and 19.

In order to dampen and silence the action of the main valve 30 which would otherwise have a tendency to be noisy under high pressures, provision is made of a dash-pot comprising an upwardly extending piston 42 integral with said lower plate 37 and a depending cylinder 43 connected to the upper diaphragm plate 41, as by a threaded rod 44 and nuts 45. The piston 42 is adapted to fit loosely within said cylinder 43 and serves to prevent water hammering.

In order to reduce the pressure in the control chamber 39 and thus permit the overbalancing pressure in the inlet chamber 25 to raise the main valve 30 off of its seat 31, provision is made of a relief valve comprising a horizontal piston 46 adapted to engage a tubular seat 47 located within a cylinder 48, said cylinder 48 being secured to a vertical block 49 attached to the side wall of the lower casting 11. The block 49 has a horizontal passage 50 in alinement with a passage 51 in the wall of the casting 11 and communicating with the vertical passage 17 leading down to the control chamber 39.

The relief valve cylinder 48 is provided with a forwardly and downwardly extending vertical fulcrum plate 52 carrying a pin 53 upon which is pivoted the rear short section 54 of a jointed lever 55. The rear section 54 is provided intermediate its ends with a vertical bridge section 56 adapted to be normally engaged by the top vertical part of the angular rear end of the long section 57 of the jointed lever 55. The lower part of the rear end of the long section 57 is beveled at 58 so as to permit said section 57 to rock about a pivot pin 59 carried by a pair of bifurcated arms 60 of the rear short section 54 during the falling or rising of the float 10a.

Extending forwardly from the relief valve piston 46 is a vertical plate section 61 having an inverted T-shaped slot 62 formed therein, the lower end of the slot 62 being adapted to loosely surround the pivot pin 53, while the upper end of said slot is fitted about a roller 63 mounted upon a pin 64. By means of this construction, when the float 10a drops, the roller 63 will move the relief valve piston 46 from the closed position shown in Figs. 1, 4, and 5 to the open position shown in Fig. 6.

In order to produce a delayed quick-opening and closing action of the relief valve 46, the relief valve cylinder 48 is provided on its top with a horizontal resilient catch arm 65 having a depending rearwardly inclined forward extremity 66 to which is secured a cam block member 67 having a forwardly inclined face 67a forming a guide for a roller 68 mounted upon a pin 69 on the upper end of an L-shaped trigger bracket 70, the latter being mounted upon the top of the long section 57 of the jointed lever 55 and secured thereto, as by a bolt 71.

The lower face of the long section 57 is provided with a flat spring 72 secured in place by a bolt 73 and having its free extremity 74 located in flat contact with the bridge 56 of the short section 54. It will thus be seen that said spring 72 will normally resist the flexing forces exerted by the float upon the jointed lever 55 and will tend to keep the sections 54 and 57 thereof in alinement.

In operation, assuming the boiler or other reservoir 29 to be full and with the float 10a in the raised position shown in Figs. 1 and 4, the relief valve 46 will be held shut by the pressure of the roller 63 acting on the slotted plate section 61 of the piston 46. The trigger roller 68 at this time will rest upon the top of the catch arm 65 and will be prevented from moving over the edge of said catch arm because of the fact that said roller 68 can swing only about the axis of the pivot pin 53 in an arc A, as indicated in Fig. 7. When the level of the liquid in the float casing 10 has fallen to a predetermined point, the weight of the float 10a will cause the long section 57 of the jointed lever to flex with respect to the short section 54, this action causing the trigger roller 68 to move in an arm C to assume a position at an increased distance from said axis 53, as shown in Fig. 5, where it can swing about the axis of the pin 53 in an arc B, said arc B lying beyond the edge of the catch arm 65. Consequently, the roller 68 will be permitted to move off of the edge of said catch arm 65 and will suddenly slide down the cam block 67. The force of the spring 72 will then immediately cause the jointed sections 54 and 57 of the lever 55 to again straighten out, thereby suddenly snapping the relief valve 46 to the right into the open position shown in Fig. 6. It will be understood that after the spring 72 has straightened out the jointed lever 55, the trigger roller 68 will be again located on the arc A, and hence the valve will be temporarily locked in open position.

In other words, the float 10a will be prevented from rising by the engagement of the trigger roller 68 by the cam block 67, and the relief valve piston 46 will be caused to remain open until the liquid level has risen to such a point that the buoyant force of the liquid on the float 10a will be sufficient to once more force the trigger roller 68 out upon the arc B. The trigger roller 68 will then be moved suddenly upward over the cam block 67 upon the top of the catch arm 65, thus instantly closing the relief valve. The spring 72 will immediately straighten out the jointed lever 55 and the trigger roller will return to the arc A assuming its original locked position.

It will thus be seen that by means of the present invention, a delayed, quick opening and closing action of the relief valve will be accomplished, thereby entirely preventing the possibility of wire-drawing therein.

In the modified form of the invention shown in Fig. 3 the construction is identical with that shown in the first form already described except that instead of the rearwardly inclined arm 66 and cam block 67 of the first form of the invention, the end of the resilient catch arm 75 is provided with a vertical depending lug 76 having a roller 77. By means of this construction, a similar delayed quick-opening and quick-closing action will be secured without requiring the use of the spring 72, which is omitted in the modified form of the invention shown in Fig. 3.

In the operation of the modified form of the invention, the roller 68 will be prevented from passing over the roller 77 until the liquid level has fallen to such a point that the weight of the float will depress the catch arm 75 sufficiently to permit the trigger roller 68 to move over the end of the catch roller 77 and drop below the catch arm 75, thereby opening the relief valve. Conversely, during the closing action of the relief valve, as the float 10a rises, the buoyancy of the water will eventually flex the jointed lever 55 and permit the trigger roller 68 to ride up over the catch roller 77 to its original position on the catch arm 75, thereby locking the relief valve in closed position.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an automatic liquid-feeding valve, a float casing containing a float and a pivoted lever for carrying said float, a main casing containing a main valve, a diaphragm dividing said main casing into a main chamber and control chamber, a by-pass connecting said chambers, a relief valve connected to the end of said float lever for releasing liquid from said control chamber to permit said diaphragm to rise and open said main valve, and means for causing a delayed sudden opening and closing of said relief valve to avoid the possibility of wire-drawing.

2. In an automatic liquid-feeding valve, a float casing containing a float, a main casing containing a main valve, a flexible diaphragm dividing said main casing into a main chamber and a control chamber, said diaphragm being connected to said main valve, a by-pass connecting said chambers, a relief valve operatively connected with said float for releasing a small quantity of liquid from said control chamber to permit said diaphragm to rise and lift said main valve, and means for slowing up and silencing the action of said main valve when operating under high pressures.

3. In an automatic liquid-feeding valve, a float casing containing a float and a pivoted lever for carrying said float, a main casing containing a main valve, a diaphragm dividing said main casing into a main chamber and a control chamber, a by-pass connecting said chambers, a relief valve connected to the end of said float lever for releasing liquid from said control chamber to permit said diaphragm to rise and open said main valve, means for causing a delayed sudden opening and closing of said relief valve to avoid the possibility of wire-drawing, and means for slowing up and silencing the action of said main valve when operating under high pressures.

4. In an automatic liquid-feeding valve, a float casing containing a float, a main casing containing a main valve, a flexible diaphragm dividing said main casing into a main chamber and a control chamber, said diaphragm being connected to said main valve, a by-pass connecting said chambers, a relief valve operatively connected with said float for releasing a small quantity of liquid from said control chamber to permit said diaphragm to rise and lift said main valve, and a dash-pot for slowing up and silencing the action of said main valve when operating under high pressures.

5. In an automatic liquid-feeding valve, a float casing containing a float, a main casing containing a main valve, a flexible diaphragm dividing said main casing into a main chamber and a control chamber, said diaphragm being connected to said main valve, a by-pass connecting said chambers, a relief valve operatively connected with said float for releasing a small quantity of liquid from said control chamber to permit said diaphragm to rise and lift said main valve, and a dash-pot connecting said main valve with said main casing for slowing up and silencing the action of said main valve when operating under high pressures.

6. In an automatic liquid-feeding valve, a float casing containing a float, a main casing containing a main valve, a flexible diaphragm dividing said main casing into a main chamber and a control chamber, said diaphragm being connected to said main valve, a by-pass connecting said chambers, a relief valve operatively connected with said float for releasing a small quantity of liquid from said control chamber to permit said diaphragm to rise and lift said main valve, and a dash-pot connecting said main valve with said main casing for slowing up and silencing the action of said main valve when operating under high pressures, said dash-pot being located within said diaphragm for producing a compact arrangement of parts.

7. In an automatic liquid-feeding valve for controlling the flow of liquid from a continuous source of supply into a reservoir, a valve casing having an inlet connected to said source and an outlet connected to said tank, a main valve for closing said outlet, a diaphragm connected to said main valve and dividing said chamber into a main chamber and a control chamber, a dash-pot comprising an inverted cylinder connected to said casing and a piston loosely fitting within said cylinder connected to said main valve, and means responsive to the drop in level in said reservoir for releasing liquid from said control chamber to cause the unbalanced pressure in said main chamber to raise said diaphragm and open said main valve and thereby permit water to be fed into said reservoir.

8. In a float-controlled mechanism, a float casing adapted to contain a liquid, a float in said casing adapted to be supported by said liquid, a jointed lever connected to said float and pivotally mounted in said casing, an operating member slidably connected to one arm of said jointed lever, a leaf spring for normally maintaining the arms of said lever in alinement, means to releasably hold said float from downward movement until the liquid level has fallen to a predetermined point, and means for then suddenly releasing said float to rapidly actuate said operating member.

9. In a float-controlled mechanism, a float casing adapted to contain a liquid, a float in said casing adapted to be supported by said liquid, a jointed lever connected to said float and pivotally connected to said casing, an operating member connected to said lever, means to hold said lever from flexing until the liquid level has fallen to a predetermined point, and means for then suddenly releasing said float permitting flexing of said lever for allowing it to rapidly actuate said operating member.

10. In a float-controlled mechanism, a float casing adapted to contain a liquid, a float in said casing adapted to be supported by said liquid, a jointed lever connected to said float and pivotally mounted in said casing, an operating member slidably connected to one arm of said jointed lever, a spring for normally maintaining the arms of said lever in alinement, means to releasably hold said float from downward movement until the liquid level has fallen to a predetermined point, and means for then suddenly releasing said float to rapidly actuate said operating member.

11. In a float-controlled mechanism, a float casing adapted to contain a liquid, a float in said casing adapted to be supported by said liquid, a jointed lever connected to said float and pivotally mounted in said casing, an operating member slidably connected to one arm of said jointed lever, a leaf spring for normally maintaining the arms of said lever in alinement, means to releasably hold said float from downward movement until the liquid level has fallen to a predetermined point, and means to permit said jointed lever to flex and release said holding means for rapidly actuating said operating member.

12. In a float-controlled mechanism, a float casing adapted to contain a liquid, a float in said casing adapted to be supported by said liquid, a lever connected to said float and pivotally connected to said casing, an operating member connected to said lever, a trigger on said lever, a catch member supported by said casing for normally holding said trigger to prevent said float from falling, and means for suddenly increasing the distance of said trigger from its pivotal axis to permit it to ride off the end of said catch member and allow said float to suddenly drop for rapidly actuating said operating member.

13. In a float-controlled mechanism, a float casing adapted to contain a liquid, a float in said casing adapted to be supported by said liquid, a lever connected to said float and pivotally connected to said casing, an operating member connected to said lever, a trigger on said lever, a resilient catch member supported by said casing for normally holding said trigger to prevent said float from falling, and means for suddenly increasing the distance of said trigger from its pivotal axis to permit it to ride off the end of said catch member and allow said float to suddenly drop for rapidly actuating said operating member.

14. In a float-controlled mechanism, a float casing adapted to contain a liquid, a float in said casing adapted to be supported by said liquid, a lever connected to said float and pivotally connected to said casing, an operating member connected to said lever, a trigger on said lever, a catch member supported by said casing for normally holding said trigger to prevent said float from falling, and means for suddenly increasing the distance of said trigger from its pivotal axis to permit it to ride off the end of said catch member and allow said float to suddenly drop for rapidly actuating said operating member, said trigger having a roller on its free extremity for engaging said catch member.

15. In an automatic liquid-feeding valve, a float casing containing a float and a pivoted lever for carrying said float, a main casing containing a main valve, a diaphragm dividing said main casing into a main chamber and control chamber, a by-pass connecting said chambers, a relief valve connected to the end of said float lever for releasing liquid from said control chamber to permit said diaphragm to rise and open said main valve, and means for causing a delayed sudden opening of said relief valve to avoid the possibility of wire-drawing.

In testimony whereof, I have affixed my signature to this specification.

CHARLES NOEL FLAGG.